UNITED STATES PATENT OFFICE.

ALFRED ERNEST BERSEY, OF DOBWALLS, LISKEARD, ENGLAND.

BOX OR CARRIER FOR LIVE BIRDS.

1,387,759.  Specification of Letters Patent.  Patented Aug. 16, 1921.

Application filed December 27, 1918. Serial No. 268,569.

*To all whom it may concern:*

Be it known that I, ALFRED ERNEST BERSEY, subject of the King of Great Britain and Ireland, residing at Kilham Poultry Farm, Dobwalls, Liskeard, in the county of Cornwall, England, have invented certain new and useful Improvements in Boxes or Carriers for Live Birds, of which the following is a specification.

This invention has for its object the production of a box for the packing and transit of live chickens and other similar birds, so constructed and arranged that each bird is kept warm in a well ventilated nest or separate compartment and is protected from being injured during the transit of the same.

In the accompanying drawings:—

Figure 1:
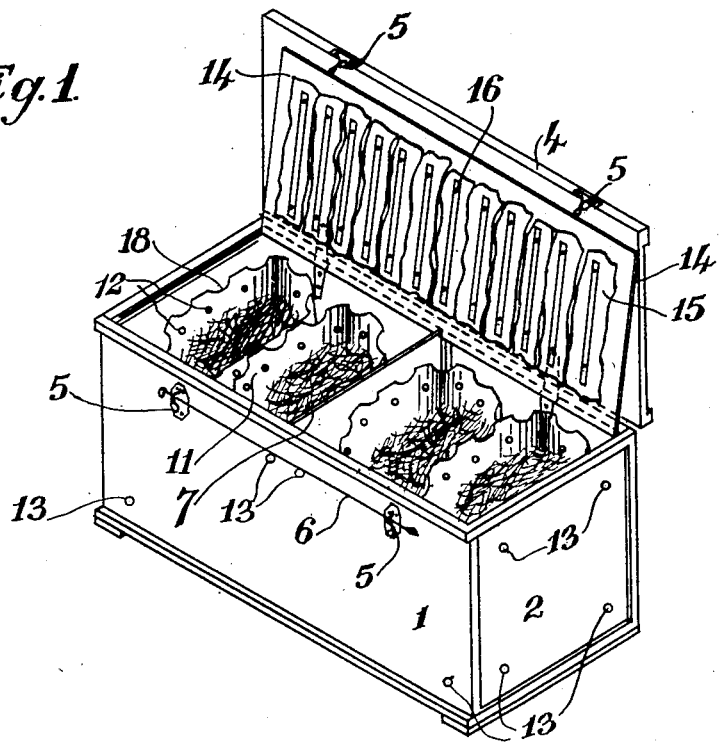
Figure 1 is an isometric view of the improved box with the lid raised.
Figure 2:
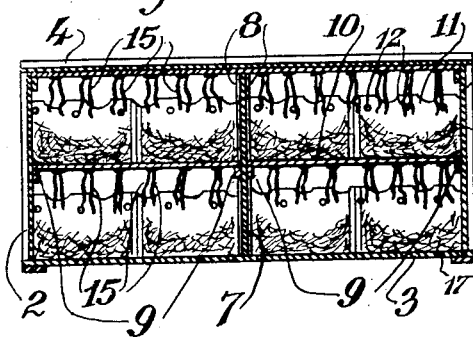
Fig. 2 is a sectional elevation of the box.
Figure 3:
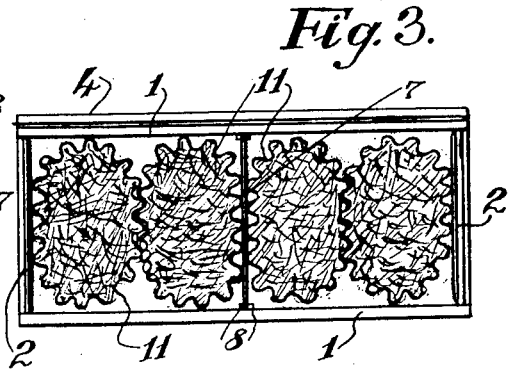
Fig. 3 is a plan of the box.

The improved box has rigid sides, 1, ends 2, and a bottom 3, and these parts are securely connected together, also there is a lid 4 which is hinged to one of the sides. Suitable means are provided for fastening the lid 4 in its closed position, and such means may consist of staples 5, and a wire 6 which is threaded through the staples and secured in position by a padlock, and in the sides and ends there are air holes 13.

In the box shown there is a vertical dividing board 7 which is fitted to slide between guide strips 8 and this board and both ends 2 are provided with ledges 9 for supporting other boards 10, by which arrangement the box is divided into four compartments by the boards 7 and 10 which are readily removable for cleaning and other purposes. Inside each of the compartments there are one or more nest frames 11 which are without top or bottom pieces, and are made of pieces of plain or corrugated cardboard or similar material. These frames may be made to tightly fit the compartments or they may be a loose fit and be held in position by any suitable form of paper clips. The sides of the frames are provided with air holes 12 or with edge recesses 18 for efficiently ventilating the inside of the frames, or both holes and recesses may be provided.

Attached to the underside of the boards 10 and to the top cover plate 14 there are pieces of flannel 15 or other similar material which may be in strips as shown attached by pieces of cardboard or wood 16, and such pieces of flannel are of such a size that when over the nest frames 11 they project into such frames and form a warm projecting covering to the birds in such frames. At the bottom of each nest is placed a layer of hay or the like 17 for the bird to rest upon.

What I claim as my invention and desire to obtain by Letters Patent is:—

1. A case for the transit of live birds comprising a box, a lid hinged thereto, means for securing said lid, air holes in the sides and end of the box, a vertical division member, ledges on the ends of the box and on said division member, horizontal division members detachably resting on said ledges, and a plurality of strips of fabric secured to the undersides of the lid and the horizontal division members, the ends of said strips depending loosely and freely.

2. A case for the transit of live birds comprising a box, a lid hinged thereto, means for securing said lid, air holes in the sides and end of the box, a vertical division member, ledges on the ends of the box and on said division member, horizontal division members detachably resting on said ledges, nest frames having vertical sides of sheet material within the spaces inclosed by the box and the division members, and a plurality of strips of fabric secured to the undersides of the lid and the horizontal division members, the ends of said strips depending loosely and freely.

3. A case for the transit of live birds comprising a box, a lid hinged thereto, means for securing said lid, air holes in the sides and end of the box, a vertical division member, ledges on the ends of the box and on said division member, horizontal division members detachably resting on said ledges, nest frames having vertical sides of corrugated sheet material within the spaces inclosed by the box and the division members, and a plurality of strips of fabric secured to the undersides of the lid and the horizontal division members, the ends of said strips depending loosely and freely.

ALFRED ERNEST BERSEY.